US010830610B2

(12) United States Patent
Murray et al.

(10) Patent No.: US 10,830,610 B2
(45) Date of Patent: Nov. 10, 2020

(54) METHOD AND APPARATUS FOR MOTOR ROTOR POSITION DETERMINATION

(71) Applicant: Analog Devices, Inc., Norwood, MA (US)

(72) Inventors: Brendan Aengus Murray, Los Angeles, CA (US); Jens Engen Sorensen, Carlsbad, CA (US)

(73) Assignee: Analog Devices, Inc., Norwood, MA (US)

( * ) Notice: Subject to any disclaimer, the term of this patent is extended or adjusted under 35 U.S.C. 154(b) by 214 days.

(21) Appl. No.: 15/276,485

(22) Filed: Sep. 26, 2016

(65) Prior Publication Data

US 2018/0087925 A1 Mar. 29, 2018

(51) Int. Cl.
*H02P 21/18* (2016.01)
*G01D 5/12* (2006.01)
*H02P 6/182* (2016.01)

(52) U.S. Cl.
CPC ............. *G01D 5/12* (2013.01); *H02P 6/182* (2013.01); *H02P 21/18* (2016.02)

(58) Field of Classification Search
CPC ............ G01R 19/14; G01D 5/12; H02P 6/182
See application file for complete search history.

(56) References Cited

U.S. PATENT DOCUMENTS

| 6,005,783 | A | 12/1999 | Xue et al. |
| 7,072,778 | B2 | 7/2006 | Swanson |
| 7,245,104 | B2 | 7/2007 | Tomigashi et al. |
| 2008/0169782 | A1* | 7/2008 | Piippo ..................... H02P 21/26 318/715 |
| 2010/0176756 | A1* | 7/2010 | Kawashima .............. H02P 1/24 318/400.1 |
| 2010/0225262 | A1* | 9/2010 | Matsuo .................... H02P 6/185 318/400.33 |
| 2013/0193884 | A1* | 8/2013 | Tamai ..................... H02P 1/46 318/400.11 |
| 2014/0077738 | A1* | 3/2014 | Iwaji ..................... H02P 21/24 318/400.36 |
| 2014/0125265 | A1* | 5/2014 | He ......................... H02P 6/002 318/400.26 |

(Continued)

FOREIGN PATENT DOCUMENTS

| CN | 1531772 | 9/2004 |
| CN | 101750512 | 6/2010 |

(Continued)

OTHER PUBLICATIONS

"Chinese Application Serial No. 201710882504.4, Office Action dated Nov. 4, 2019", with Concise Statement of Relevance Under 37 CFR 1.98(a)(3)(i), 11 pages.

(Continued)

*Primary Examiner* — Jeff W Natalini
(74) *Attorney, Agent, or Firm* — Schwegman Lundberg & Woessner, P.A.

(57) ABSTRACT

This application discusses techniques for providing sensorless rotor position information of a multiple phase motor without using predetermined motor parameters or models, other than the number of phases of the motor. In certain examples, motor rotor position information can be provided using samples of current from zero-voltage vectors of the motor windings.

20 Claims, 6 Drawing Sheets

(56) References Cited

U.S. PATENT DOCUMENTS

| | | | | |
|---|---|---|---|---|
| 2014/0210385 A1* | 7/2014 | Kozaki | ................ | F04D 29/058 318/400.02 |
| 2014/0239863 A1* | 8/2014 | Melanson | ............... | H02P 6/182 318/400.34 |
| 2014/0265973 A1* | 9/2014 | McCleer | ................ | H02P 6/181 318/400.42 |
| 2014/0266222 A1* | 9/2014 | Baughman | ............ | H02J 7/0021 324/426 |
| 2015/0236628 A1* | 8/2015 | Wang | ..................... | H02P 6/182 318/139 |
| 2015/0280626 A1* | 10/2015 | Ye | ........................ | H02P 25/089 318/400.32 |

FOREIGN PATENT DOCUMENTS

| | | |
|---|---|---|
| CN | 103762913 | 4/2014 |
| CN | 103973184 | 8/2014 |
| CN | 104049128 | 9/2014 |
| CN | 104660148 | 5/2015 |
| CN | 104734581 | 6/2015 |

OTHER PUBLICATIONS

"Chinese Application Serial No. 201710882504.4, Response filed Mar. 18, 2020 to Office Action dated Nov. 4, 2019", w/English Claims, 17 pgs.

\* cited by examiner

METHOD AND APPARATUS FOR MOTOR ROTOR POSITION DETERMINATION

TECHNICAL FIELD OF THE DISCLOSURE

Methods and apparatus for providing motor rotor position information of a motor are provided and, more particularly, for providing motor rotor position without using a sensor coupled directly to the rotor and without using predetermined motor characteristics or models.

BACKGROUND

Closed loop motion control systems can use position feedback to significantly enhance velocity and position control of an axis. It has become increasingly more common for motion control systems to use motors that do not include brushes, brushless motors, as such motors can have a significant advantage in that maintenance of brushes is not needed. However, in order to commutate the magnetic field within the motor so as to achieve acceptable velocity or position control, knowledge of the motor rotor position can be useful, and in some cases necessary.

SUMMARY OF THE DISCLOSURE

This application discusses techniques for providing sensorless rotor position information of a motor without using predetermined motor parameters or models, other than the number of phases of the motor. In certain examples, motor rotor position information can be provided using samples of phase current when zero-voltage vectors are applied to the motor windings.

In an example, a method can include oversampling phase current of a motor during one or more zero vectors, correlating a position of a rotor of the motor to a change in slope of phase current of the a motor, and providing first rotor position information relative to a position of a phase winding of the motor using the correlation. In some examples, the motor can be a permanent magnet motor. In some examples the motor can be an alternating-current (AC) motor, including an AC induction motor.

This summary is intended to provide an overview of subject matter of the present patent application. It is not intended to provide an exclusive or exhaustive explanation of the invention. The detailed description is included to provide further information about the present subject matter.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Brushless closed-loop motor control systems can often rely on motor rotor position to provide optimum performance. Motor rotor position can be obtained either through direct measurement (for example by an encoder or resolver) or through algorithms which estimate the rotor position based on a model of the motor or a model of the motor system. Since no position sensor is used in the latter category these methods are usually called sensorless. The present inventors have recognized apparatus and methods for sensorless measurement of motor rotor position that are insensitive to parameter variation of motors. In certain examples, higher order effects found in the motor phase currents can allow for accurate, precise measurement of motor rotor position without the need for the system to use predetermined parameters of the motor, a model of the motor or a model of the axis that includes the motor.

Figure 1:
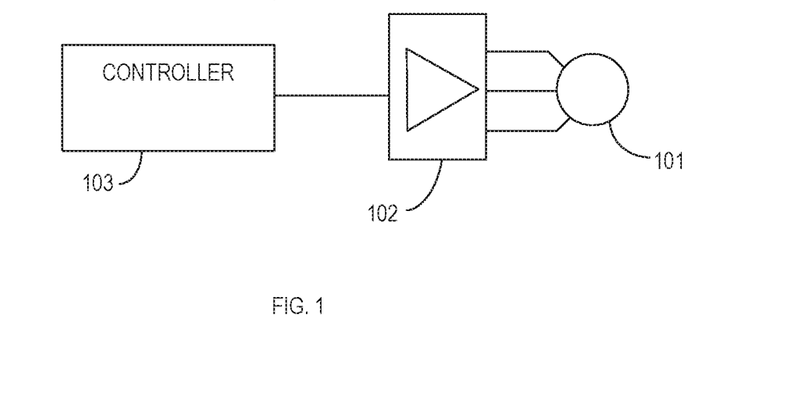
FIG. 1 illustrates generally a system according to various examples of the present subject matter.

FIG. 1 illustrates generally a system 100 according to various examples of the present subject matter. In certain examples, the system can include a multiple-phase (multi-phase) motor 101, an amplifier or power stage 102, and a controller 103. In certain examples, the motor 101 can be an induction motor, such as an alternating-current (AC) induction motor, which are very common for both commercial use and consumer products. Induction motors are also very robust as the motor does not use brushes or magnets to facilitate normal operation. In some examples, the motor can be a permanent magnet motor, such motors can include brushless DC motors and permanent magnet AC motors.

In certain examples, the power stage 102 can include switches for converting a supply bus ($V_{IN}$) into power signals to move the motor 101. In certain examples, the supply bus ($V_{IN}$) can be a DC bus. In some examples, the power stage 102 can include an input power stage to receive input power and convert it to a proper voltage and type for the supply bus. For example, and input power stage may receive AC voltage and convert it to a DC bus. Current flow in the windings of the motor 101 can depend on the switching state of the power stage 102. For example, for a system that uses a DC bus, the power stage 102 can connect any of the windings of the motor with either the positive or negative DC power rail. The winding inductance can act as a low pass filter and so the average winding current during a switching cycle is a function of the average winding voltage and motor induced voltages, sometimes referred to as back electromotive force (BEMF). In certain examples, the controller 103 can provide command information for the power stage 102 to regulate the average winding voltage to control the motor current, torque, velocity, or position. In certain examples, the system 100 can include one or more feedback devices (not shown) to provide rotor position or rotor velocity information. Although the power stage 102 and the controller 103 can generate motor movement without any motor rotor position feedback, knowledge of the rotor position at the controller 103 can enable precise jerk, acceleration, velocity and position control of the motor 101.

Figure 2:
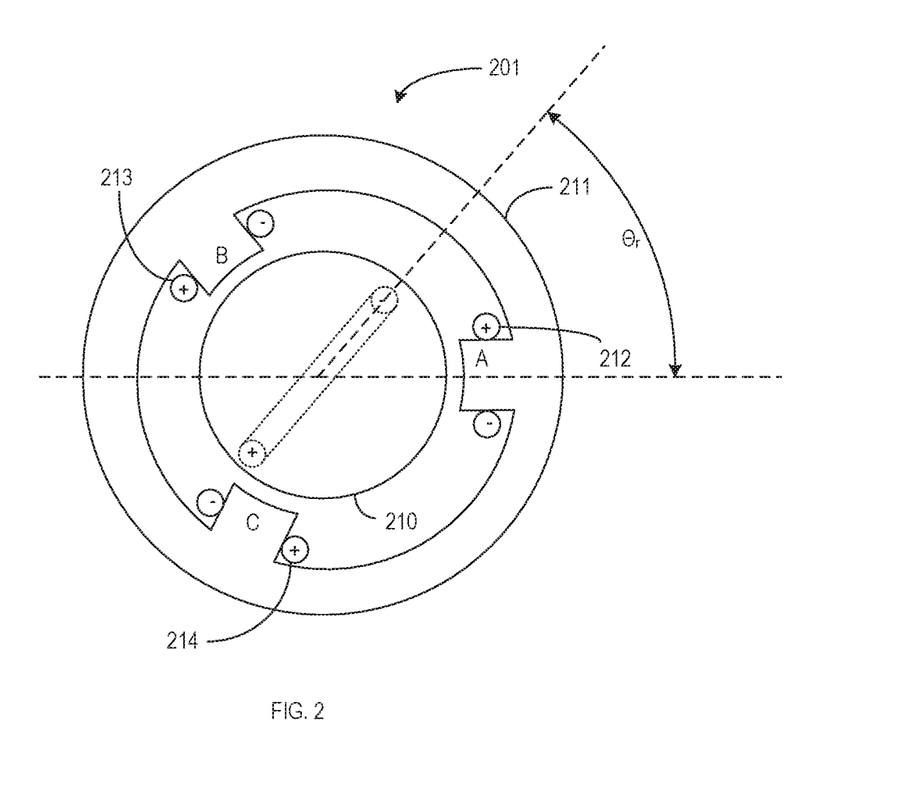
FIG. 2 illustrates generally a cross-section of a multi-phase motor.
Figure 3:
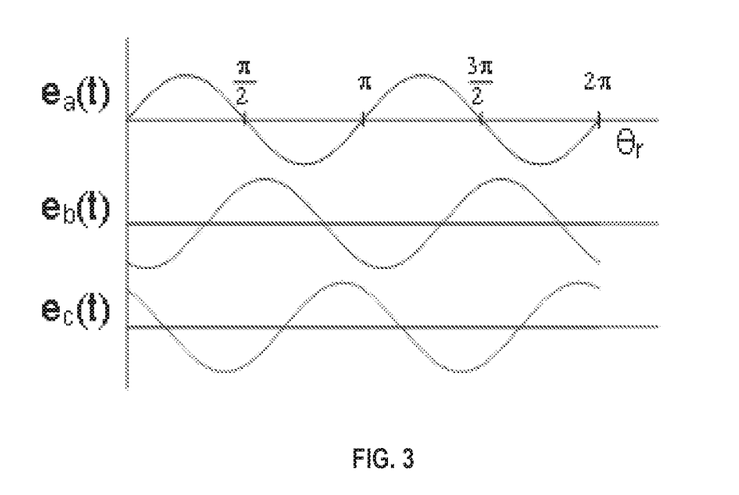
FIG. 3 illustrates generally phase shifted BEMF voltages of a motor.

FIG. 2 illustrates generally a cross-section of a multiphase motor 201. The motor 201 can include a rotor 210, a stator 211, and a number of phase windings 212, 213, 214 associated with poles of the stator 211. In general, the phase windings 212, 213, 214 can be electrically driven to generate a rotating magnetic field that couples with a magnetic field of the rotor 210. The rotor 210 can rotate in an attempt to align the magnetic poles of each of the magnetic fields. A motor drive can electrically drive each of the phase windings 212, 213, 214 in a sequence to continuously rotate the rotor 210. As the rotor 210 spins, it can induce BEMF voltages in the phase windings 212, 213, 214. These BEMF voltages $e_x(t)$, where x is a winding, can have a direct relationship with the rotor position as shown FIG. 3, where "$e_x(t)$" is the induced BEMF voltage and $\theta_r$ is the rotor position. In a 3-phase motor, phase B lags phase A by 1200 and phase C lags phase B by 1200. Therefore, the BEMF voltages can be sine functions with phase shifts as shown in FIG. 3. Thus, when the BEMF waveform is known, the rotor position ($\theta_r$) is also known. However, knowledge of the BEMF waveform can require knowledge of particulars of the motor 201, for example, winding inductance and winding resistance, just to name a few.

Figure 4:
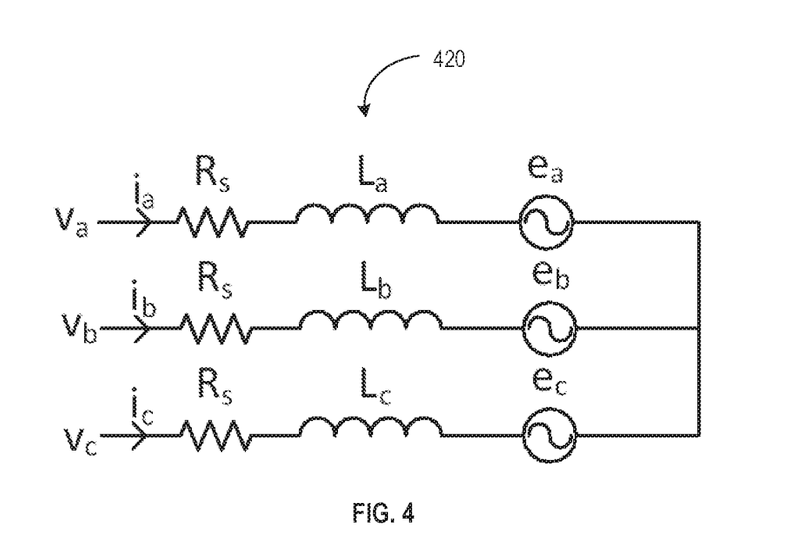
FIG. 4 illustrates generally a motor circuit.
Figure 5:
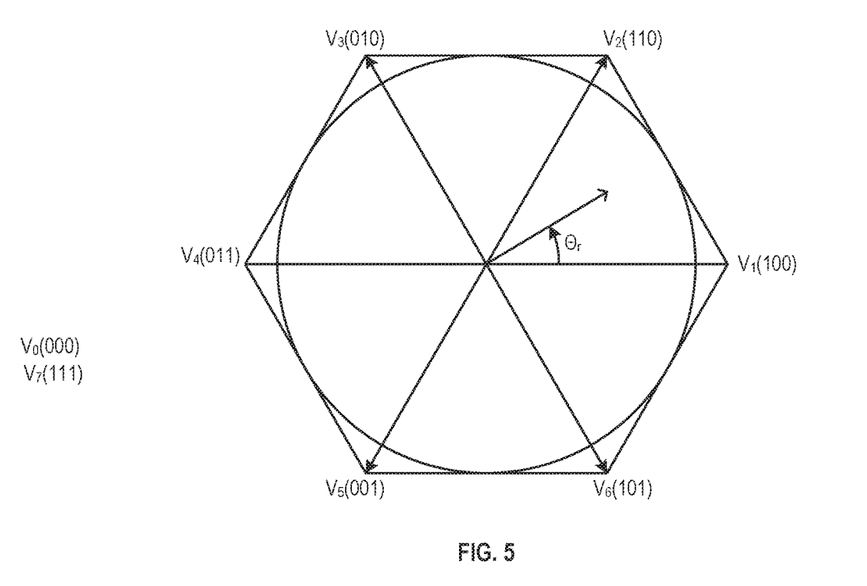
FIG. 5 illustrates generally voltage vectors associated with a two-level, three-phase inverter.
Figure 6:
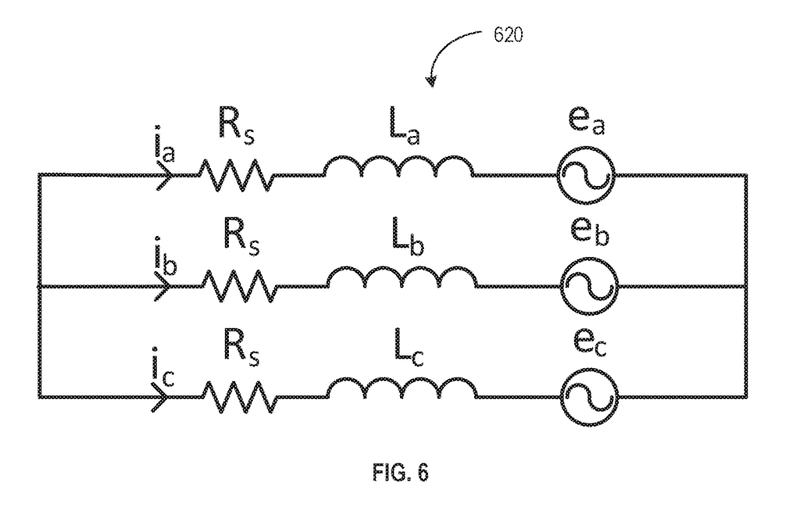
FIG. 6 illustrates generally an example of a 3-phase motor circuit during a zero-voltage vector.

FIG. 4 illustrates generally a motor circuit 420 that includes winding resistance ($R_x$), winding inductance ($L_x$), and BEMF source ($e_x$). When driven by an inverter, for example, the phase voltages ($V_x$) can be described by voltage vectors as illustrated in FIG. 5. For a three phase motor, there are 8 voltage vectors ($V_x$) including 6 active vectors (100, 110, 101, 010, 011, 001) and 2 zero vectors (111, 000). An active vector is a vector that includes at least one phase being energized by the inverter, for example, where one or more of the phase voltages (Vx) of FIG. 4 is different than the other phase voltages. For example, vector (100) can indicate a situation where a positive (+) bus voltage is applied by the inverter to phase A of the motor and both of the other phases (B, C) is coupled to a negative (−) bus voltage. Zero vectors (000), (111) can be situations where the voltages applied to each phase are the same, such as by coupling the phases together, coupling all the phases to the + bus voltage, or coupling all the phases to the − bus voltage. FIG. 6 illustrates generally an example of a 3-phase motor circuit 620 during a zero-vector. When a zero-vector is applied, the BEMF ($e_x$) is the motor driving voltage with the motor impedance limiting the current ($i_x$). In certain examples, during the switching states, the resistive impedance can be ignored so the phase impedance is inductive.

Figure 7:
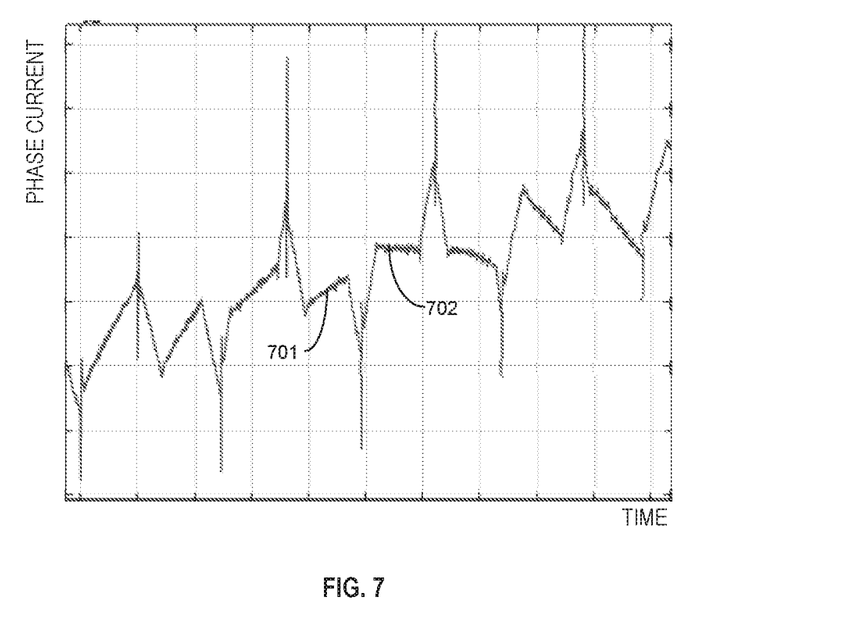
FIG. 7 illustrates generally current of a motor phase as a motor rotates.

In general, for a positive BEMF, voltage across an inductor is negative and hence the change or slope (di/dt) of the inductor current is also negative. Similarly, for negative BEMF, voltage across the inductor is positive and the change or slope di/dt of the inductor current is also positive. If the BEMF is zero, the change in phase current di/dt during the zero vector is also zero. Thus, a change in polarity of the slope of each zero vector phase current is an indication that the BEMF of that phase has made a zero-crossing. Thus, a direct relationship between a change in slope polarity of the phase current and rotor position can be established. FIG. 7 illustrates generally current of a motor phase as a motor rotates, the zero-voltage vector currents can be identified by the relatively smooth plot lines. Between the zero vectors marked 701 and 702 the slope of the phase currents during teach zero vector changes polarity, indicating the BEMF of that phase has crossed zero volts. In certain examples, a circuit, such as a detection circuit, can include timing logic, sampling circuitry and a controller to oversample the phase current during the zero-voltage vector of each phase of the motor. Murray et al., U.S. patent application Ser. No. 15/247,635, filed Aug. 25, 2016, titled, "SYSTEMS AND METHODS FOR DETERMINING MOTOR PARAMETERS", hereby incorporated by reference herein in its entirety, discusses apparatus and techniques for oversampling a signal, such as a signal indicative of phase current, and determining a slope of the signal. In certain examples, a least means square filter can be used to determine the slope of phase current using a plurality of phase current samples received during a zero-voltage vector.

Figure 8:
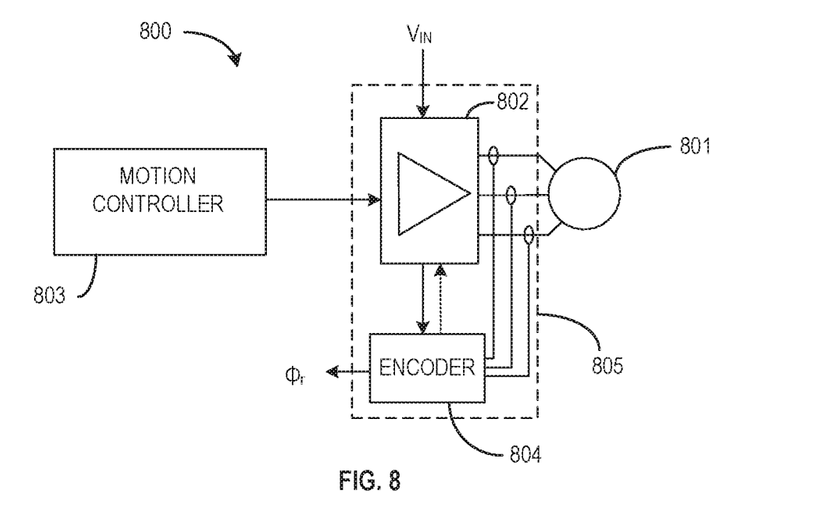
FIG. 8 illustrates generally an example system including an detection circuit for providing rotor position information ($\theta_z$) using phase current information of zero-voltage vectors.

FIG. 8 illustrates generally a system 800 including an detection circuit 804 for providing rotor position information ($\theta_r$) using phase current information of zero-voltage vectors and not using motor parameters such as winding resistance and winding inductance. The system 800 can include a multi-phase motor 801, an amplifier 802 and a detection circuit 804. In certain examples, the amplifier 802 can provide power to the multiphase motor 801 and can sequence connection of the phases of the multiphase motor to a power source ($V_{IN}$) such that the multiphase motor 801 moves or provides torque. The detection circuit 804 can include sensor inputs for receiving current information from each phase of a multiphase motor 801, an input for receiving switching information from the amplifier 802, one or more outputs to provide an encoder signal, or rotor position information ($\theta_r$), indicative of the rotor position of the motor 801, and logic for processing the received sensor and switching information and providing the encoder signal. In some examples, a motor drive 805 can optionally include the amplifier 802 and the detection circuit 804. In some examples, the detection circuit 804 can use existing current sensors or existing phase current information of the amplifier 802.

In certain examples, the detection circuit 804 can include one or more slope detectors to oversample the phase current and determine a polarity of change in phase current of each phase of the multiphase motor 801, timers and timing logic to initiate each slope detector during an associated zero-voltage vector, and hold circuitry to hold the output of the slope detectors during active voltage vectors.

Oversampling of phase current during a zero-voltage vector is accomplished in such a manner as to be able to determine a slope of the phase current during the zero-voltage vector. A straight-forward oversampling would include providing two samples of the phase current during a single zero-voltage vector and determining a slope of line connecting the two samples as if the samples were plotted using an axis for current and an axis for time. Other examples of the present subject matter can sample the phase current more than two times during the single zero-voltage vector. In such examples, one or more processors of the detection circuit 804, one or more slope detectors, or combinations thereof, can determine several slope values using the more than two samples. In certain examples, the several slope samples can be used to determine whether the slope is positive or negative. In some examples, the several slope samples can be used to, for example, determine an average slope of the phase current during the single zero-voltage vector. In some examples, the several slope samples, or the more than two current samples, can be used to determine whether the slope changes polarity during the single zero-voltage vector. In certain examples, a detection circuit 804 can use the several slope samples or the more than two phase current samples to determine whether the slope is positive or negative, to determine an average slope of the phase current during the single zero-voltage vector, to determine whether the slope changes polarity during the single zero-voltage vector, or combinations thereof.

Figure 9:
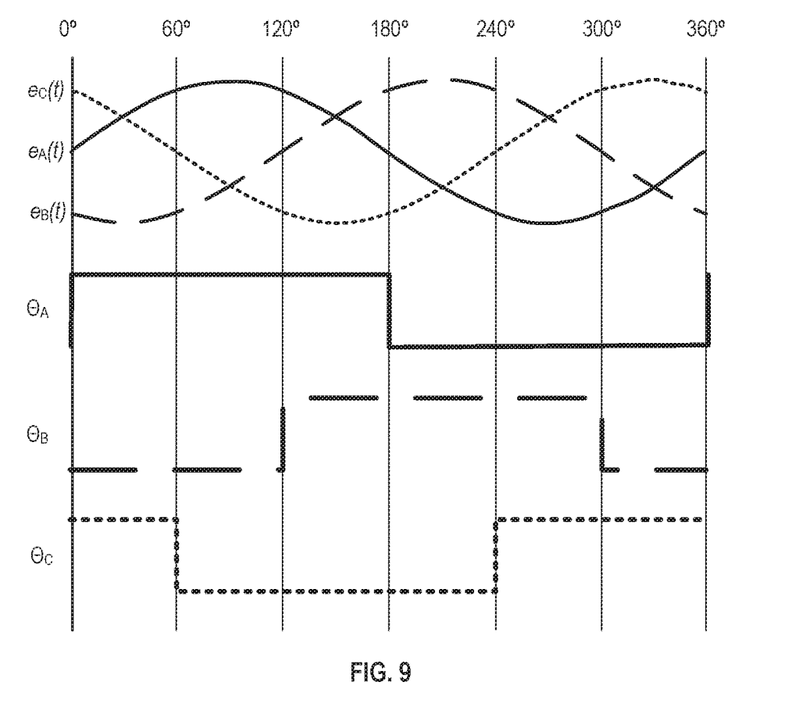
FIG. 9 illustrates generally an example output ($\theta_A$, $\theta_B$, $\theta_C$) of the detection circuit of FIG. 8 for a three-phase motor.

In certain examples, the slope detector logic can provide a rotor position signal for each phase of the multiphase motor. In certain examples, each rotor position signal can include a transition associated with each change in polarity of the phase current slope. FIG. 9 illustrates generally an example output ($\theta_A$, $\theta_B$, $\theta_C$) of the detection circuit 804 for a three-phase motor, such as a three-phase AC induction motor plotted along with the BEMF voltage signals ($e_A(t)$, $e_B(t)$, $e_C(t)$) of each phase. When the state of a rotor position signal is considered with respect to the state of the other rotor position signals, the rotor position can be known within ±360/2N when there is one magnetic pole pair for each electrical phase. The formula generally holds true for each electrical cycle of the motor but can change in regards to the mechanical position of the rotor as the number of magnetic pole pairs of the motor varies with respect to the number of electrical phases.

In certain examples, the system 800 can include a motion controller 803 that can be programmed to provide command signals to the drive to move the multiphase motor 801. In some examples, the motion controller 803 can use the rotor position information ($\theta_r$) provided by the detection circuit 804 to provide precise control of jerk, acceleration, velocity, position or combinations thereof of the multiphase motor 801. In some examples, a motor drive 805 can optionally include the amplifier 802, the detection circuit 804 and the motion controller 803.

In certain examples, rotor position information ($\theta_r$) of a multiphase motor, based on the slope of the current during zero-voltage vectors, can be further processed to provide higher resolution than ±360/2N. Again, the further processing can provide the high resolution rotor position information ($\theta_r'$) without using parameters or models specific to the motor. The basis of the further processing is recognizing that the driving voltage during the zero-vector is the BEMF voltage. In general, the BEMF voltage of multiphase AC motors can be approximated by a fundamental sine component and some higher order harmonics. Since the fundamental component dominates in most motors, the BEMF voltage can be considered a sinusoidal AC voltage, consequently, since phase impedance is inductive, the slope of the current during zero-vector also follows a sinusoidal pattern.

Figure 10:
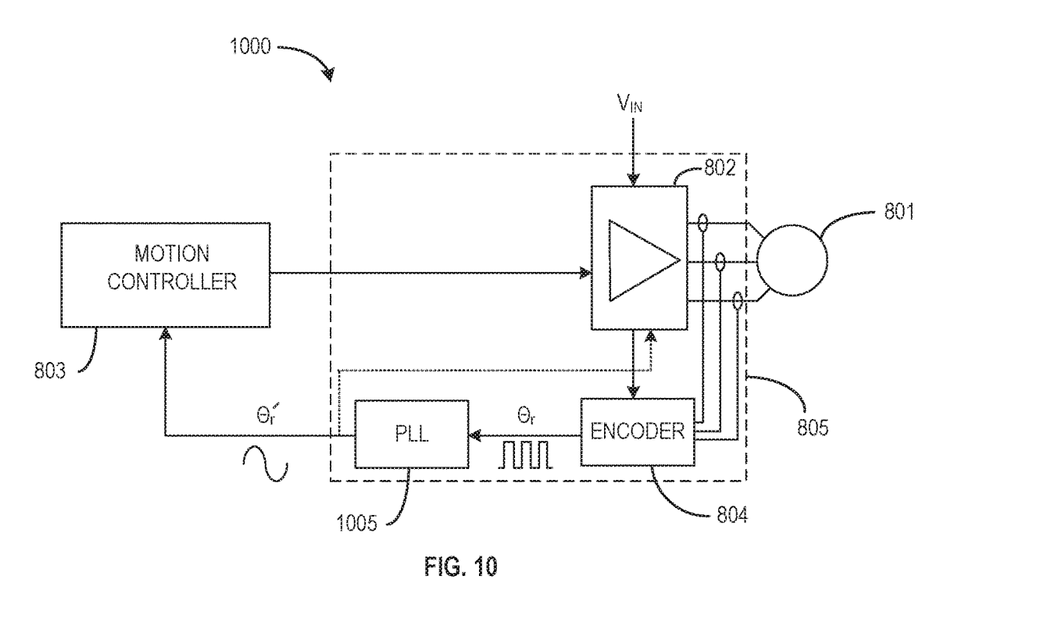
FIG. 10 illustrates generally and example system including additional processing components to provide high resolution motor rotor position information.

FIG. 10 illustrates generally and example system 1000 including additional processing components to provide high resolution rotor position information ($\theta_r'$) without using stored parameters or models of the motor 801. In addition to the components discussed above with respect to FIG. 8, the system 1001 can include a phase-lock loop (PLL) circuit 1005. In certain examples, the fundamental component of the phase current slope can be fed to the PLL circuit 1005 and the PLL circuit 1005 can track the rotor position of the motor 801. Even if the BEMF voltage, and the current slope, are not a pure sine, the PLL circuit 1005 can still track the fundamental component and extract the rotor position. In certain examples, the output of the PLL circuit 1005 can include a number of sinusoidal signals, either digital or analog, and can be decoded to provide high-resolution motor rotor position information ($\theta_r'$). In certain examples, the resolution may be limited by the resolution of the digital system such as the resolution of digital-to-analog converters or the resolution of analog-to-digital converters used in the system 1001, for example. In some examples, the number of signals provided by the PLL circuit 1005 can be equal to or less than the number of phases of the motor 801.

In certain examples, the rotor position information ($\theta_r$, $\theta_r'$) provided by the systems of FIGS. 8 and 10 can be used as feedback by a motion controller 803 to provide close loop control of jerk of the multiphase motor 801, acceleration of the multiphase motor 801, velocity of the multiphase motor 801, position of the multiphase motor 801 or combinations thereof. In some examples, the rotor position information ($\theta_r$, $\theta_r'$) can be used as a master axis position and additional axes and motors can be slaved to the master axis position. In some examples, rotor position information ($\theta_r$, $\theta_r'$) derived from the polarity change in phase current during a zero-voltage vector can be used as a secondary rotor position information source, for example, to back up an actual rotor position sensor or another sensorless rotor position generation technique.

Figure 11:
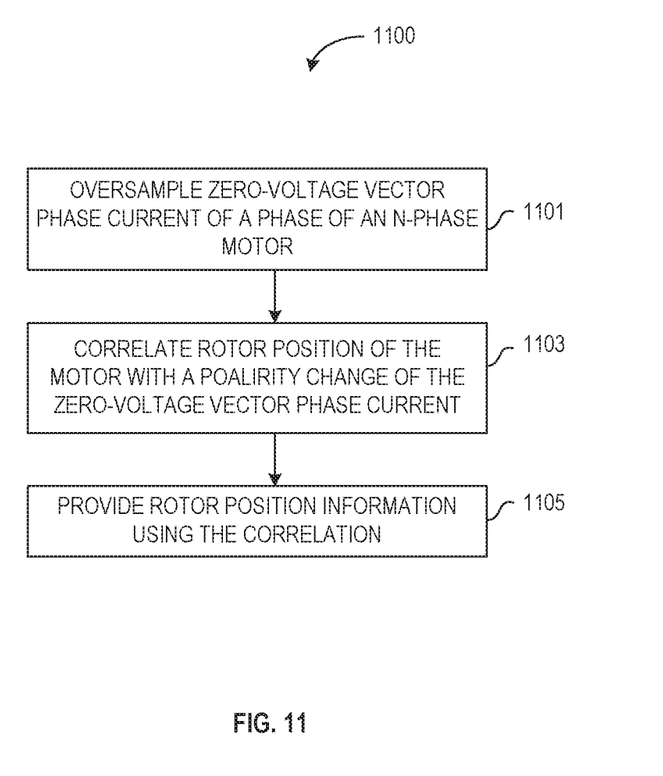
FIG. 11 illustrates generally a flow chart of an example method for providing motor rotor position information.

FIG. 11 illustrates generally a flow chart of an example method 1100 for providing rotor position information of a motor without using a position sensor attached, directly or indirectly, to the rotor of the motor. At 1101, phase current of an N-phase motor can be oversampled during a zero-voltage vector, where N is an integer number greater than 1 or greater than 2. In certain examples, the motor can be an induction motor. In some examples, the motor can be a brushless, permanent magnet motor. As discussed above, when a zero-voltage vector is applied, the primary voltage source of a phase is the back electromotive force voltage of the phase. The oversampling allows for determination of the slope of the current during the zero-voltage vector. At 1103, a position of the rotor can be correlated to a change in the slope of the zero vector phase current. In certain examples, the correlation can include determining the relationship of each phase relative to each other phase, associating a reference position of the rotor with a slope change of a particular phase, and determining a position of a the rotor based on a polarity change of zero vector phase current of a phase and the relationship of the phase with the reference position. At 1105, the rotor position information can be provided. In certain examples, the rotor position information can be relative to a particular phase winding of the motor. In some examples, the detection circuit can include a PLL to provide the rotor position information.

VARIOUS NOTES & EXAMPLES

In Example 1, a method for determining motor rotor position can include oversampling phase current of an N-phase motor during one or more zero vectors while each phase of the N-phase motor is electrically driven to rotate the N-phase motor, correlating a position of a rotor of the N-phase motor to a change in slope of phase current of the N-phase motor, and providing first rotor position information relative to a position of a phase winding of the N-phase motor using the correlation, wherein N is an integer greater than or equal to 1.

In Example 2, the correlating of Example 1 optionally includes determining a slope of the phase current during each zero vector of the one or more zero vectors.

In Example 3, the correlating of any one or more of Examples 1-2 optionally includes determining a change in polarity of the slope of the phase current.

In Example 4, the correlating of any one or more of Examples 1-3 optionally includes identifying a rotation position of a rotor of the N-phase motor using the change in polarity of the phase current slope.

In Example 5, the identifying a first rotor position of any one or more of Examples 1-4 optionally includes identifying the rotor position within 360/(2N) degrees of rotation.

In Example 6, the correlating of any one or more of Examples 1-5 optionally includes determining a slope of the phase current during each zero vector of the one or more zero vectors for each phase of the N phases, determining a change in polarity of the slope of the phase current for each phase, and wherein the providing rotor position information includes providing N channels of rotor position information.

In Example 7, the method of any one or more of Examples 1-2 optionally includes driving each phase of the n-phase motor.

In Example 8, the method of any one or more of Examples 1-2 optionally includes receiving the rotor position at a phase lock loop (PLL) and providing second rotor position information using the PLL, wherein a resolution of the second rotor position information is higher than a resolution of the first rotor position information.

In Example 9, the providing the first rotor position information of any one or more of Examples 1-8 optionally does not include using stored parameters associated with the N-phase motor.

In Example 10, the N-phase motor of any one or more of Examples 1-9 optionally is a permanent magnet motor.

In Example 11, the N-phase motor of any one or more of Examples 1-10 optionally is an induction motor.

In Example 12, the providing first rotor position information of any one or more of Examples 1-11 optionally includes generating N position signals indicative of the rotor position.

In Example 13, a transition of each signal of the N position signals of any one or more of Examples 1-12 optionally is indicative of a change in polarity of phase current of one phase of the N phases during a zero vector of the one phase.

In Example 14, the method of any one or more of Examples 1-13 optionally includes driving N phases of an N-phase motor using $2^N$ voltage vectors.

In Example 15, a circuit for providing motor rotor position information from a multiple phase motor can include a plurality of inputs configured to receive phase current information of the multiple phase motor, each input associated with a different phase of the multiple phase motor and the phase current information indicative of phase current of the multiple phase motor; and a detection circuit. The detection circuit can be configured to sample the phase current information during multiple zero voltage vectors as the multiphase motor is driven, determine a slope of the phase current during each zero voltage vector of each phase of the multiple zero vectors, determine a change in polarity of the slope of the phase current for each phase of the multiple phase motor, and provide first rotor position information of a rotor of the multiple-phase motor using the change in polarity of the phase current for each phase of the multiple phase motor.

In Example 16, the controller of any one or more of Examples 1-15 optionally does not access pre-stored motor parameters, other than the number of phases (N) of the multiple-phase motor, to determine the rotational position, wherein N is an integer number greater than or equal to 1.

In Example 17, the detection circuit of any one or more of Examples 1-16 optionally is configured to generate N signals indicative of the rotor position.

In Example 18, the circuit of any one or more of Examples 1-17 optionally includes a phase-lock loop circuit configured to receive the N signals and to generate second rotor position information, wherein the second rotor position information includes higher resolution than the first rotor position information.

In Example 19, the circuit of any one or more of Examples 1-18 optionally includes a power stage configured to drive each phase of the multi-phase motor, the power stage configured to close at least one of a velocity or torque loop with the multiple phase motor.

In Example 20, the circuit of any one or more of Examples 1-19 optionally includes a motion controller configured to provide at least one of a velocity command or a torque command as command information to the power stage, wherein the power stage is configured to receive command information from the motion controller and to drive each phase of the multiple phase motor in according to the command information, and wherein the motion controller is configured to receive the first rotor position information and to close a position loop with the multiple phase motor.

Each of these non-limiting examples can stand on its own, or can be combined in various permutations or combinations with one or more of the other examples.

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

The claimed invention is:

1. A method for determining position of a moving motor rotor, the method comprising:
   taking multiple samples of a back-electromotive force (BEMF)-induced phase current of a rotating N-phase motor during a zero voltage vector of an input voltage signal of a motor drive, the motor drive electrically coupled with each phase of the N-phase motor, wherein the input voltage signal includes at least one active vector where at least one phase is energized and includes the zero voltage vector where the N phases are not energized;
   based on the multiple samples, correlating a position of a rotor of the N-phase motor to a change in slope of BEMF-induced phase current of the N-phase motor; and
   providing first rotor position information relative to a position of a phase winding of the N-phase motor using the correlation;
   wherein N is an integer greater than 1.

2. The method of claim 1, wherein the correlating includes determining a slope of the BEMF-induced phase current during each zero voltage vector of a plurality of zero vectors.

3. The method of claim 2, wherein the correlating includes determining a change in polarity of the slope of the BEMF-induced phase current.

4. The method of claim 3, wherein the correlating includes identifying a rotation position of a rotor of the N-phase motor using the change in polarity of the BEMF-induced phase current slope.

5. The method of claim 4, wherein identifying a first rotor position includes identifying the rotor position within 360/(2N) degrees of rotation.

6. The method of claim 2, wherein the correlating includes determining a slope of the BEMF-induced phase current during each zero voltage vector of the plurality of vectors for each phase of the N phases;
   determining a change in polarity of the slope of the BEMF-induced phase current for each phase; and
   wherein the providing rotor position information includes providing N channels of rotor position information.

7. The method of claim 1, including driving each phase of the n-phase motor.

8. The method of claim 1, including receiving the rotor position at a phase lock loop (PLL);
   providing second rotor position information using the PLL, wherein a resolution of the second rotor position information is higher than a resolution of the first rotor position information.

9. The method of claim 1, wherein the providing the first rotor position information does not include using stored parameters associated with the N-phase motor.

10. The method of claim 1, wherein a transition of each signal of N position signals is indicative of a change in polarity of BEMF-induced phase current of one phase of the N phases during a zero voltage vector of the one phase.

11. The method of claim 1, including driving N phases of an N-phase motor using $2^N$ voltage vectors.

12. A circuit for providing motor rotor position information from a multiple phase motor, the circuit comprising:
   a plurality of inputs configured to receive phase current information of the multiple phase motor, each input associated with a different phase of the multiple phase motor; and
   a detection circuit configured to:
   sample the phase current information multiple times during a zero voltage vector of an input voltage signal of a motor drive configured to drive the multi-phase motor, wherein the input voltage signal includes at least one active vector where at least one phase is energized and includes the zero voltage vector where the multiple phases are not energized;
   based on the samples, determine a slope of BEMF-induced phase current during the zero voltage vector;
   determine a change in polarity of the slope of the BEMF-induced phase current for each phase of the multiple phase motor; and
   provide first rotor position information of a rotor of the multiple-phase motor using the change in polarity of the slope of the BEMF-induced phase current for each phase of the multiple phase motor.

13. The circuit of claim 12, wherein the detection circuit does not access pre-stored motor parameters, other than the number of phases (N) of the multiple-phase motor, to determine the rotational position, wherein N is an integer number greater than or equal to 2.

14. The circuit of claim 13, wherein the detection circuit is configured to generate N signals indicative of the rotor position.

15. The circuit of claim 14, including a phase-lock loop circuit configured to receive the N signals and to generate second rotor position information, wherein the second rotor position information includes higher resolution than the first rotor position information.

16. The circuit of claim 12, including a power stage configured to drive each phase of the multi-phase motor, the power stage configured to close at least one of a velocity or torque loop with the multiple phase motor.

17. The circuit of claim 16, including a motion controller configured to provide at least one of a velocity command or a torque command as command information to the power stage;

wherein the power stage is configured to receive command information from the motion controller and to drive each phase of the multiple phase motor in according to the command information; and     wherein the motion controller is configured to receive the first rotor position information and to close a position loop with the multiple phase motor.

18. A motion control system comprising:

a multiple-phase motor;

a drive configured to receive a command signal and to provide power using an input voltage signal to move a first component of the multiple-phase motor relative to a second component of the multiple-phase motor to provide motor motion; and a controller configured to:

sample back electromotive force (BEMF)-induced phase current information multiple times during each of a plurality of zero voltage vectors during the motor motion;

based on the samples, determine a slope of the BEMF-induced phase current during each zero voltage vector of each phase of the multiple zero vectors, wherein the input voltage signal includes at least one active vector where at least one phase is energized and includes the zero voltage vector where the N phases are not energized;

determine a change in polarity of the slope of the BEMF-induced phase current for each phase of the multiple phase motor; and provide first position information of the multiple-phase motor using the change in polarity of the slope of the BEMF-induced phase current for each phase of the multiple-phase motor.

19. The method of claim 18, wherein the multiple-phase motor is a permanent magnet motor.

20. The method of claim 18, wherein the multiple-phase motor is an induction motor.

\* \* \* \* \*